Figure 1:
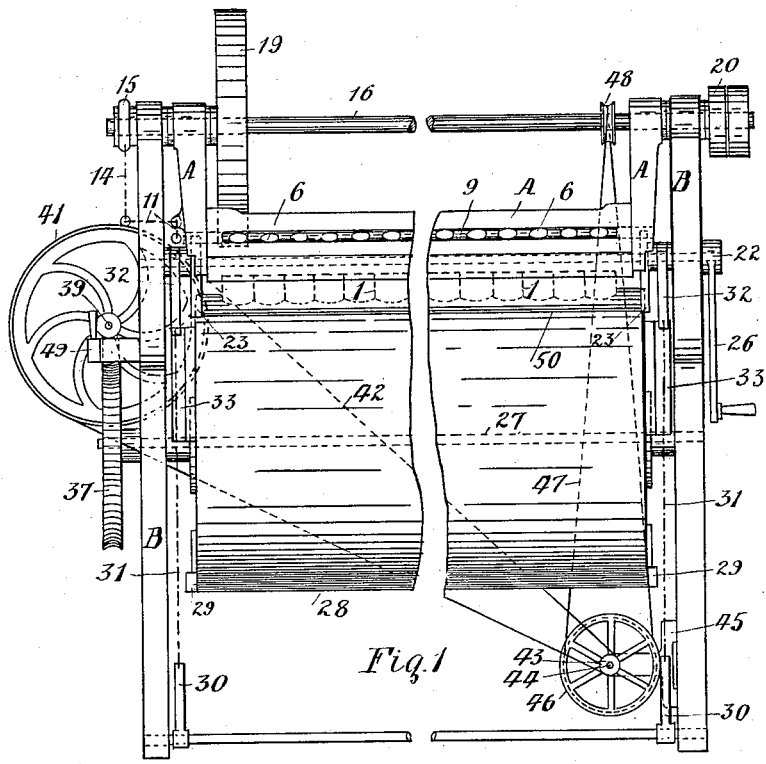

H. A. ROBERTS.
MACHINE FOR SHEARING SHEEP SKINS AND HIDES.
APPLICATION FILED AUG. 20, 1913.

1,164,751.

Patented Dec. 21, 1915.

3 SHEETS—SHEET 1.

Witnesses
William Walker
Oliver Walker

Inventor
Henry Alfred Roberts

UNITED STATES PATENT OFFICE.

HENRY ALFRED ROBERTS, OF REDFERN, SYDNEY, NEW SOUTH WALES, AUSTRALIA.

MACHINE FOR SHEARING SHEEP SKINS AND HIDES.

1,164,751.  Specification of Letters Patent.  Patented Dec. 21, 1915.

Application filed August 20, 1913. Serial No. 785,643.

*To all whom it may concern:*

Be it known that I, HENRY ALFRED ROBERTS, a subject of the King of Great Britain, residing at 1 William street, Redfern, Sydney, New South Wales, Australia, have invented certain new and useful Improvements in Machines for Shearing Sheep Skins and Hides, of which the following is a specification.

This invention has for its object the shearing of sheep skins or hides, after they are removed from the carcass.

It consists of a swinging frame, preferably of cast iron, beneath and in front of which is formed a longitudinal recess, in which is aggregated contiguously, removable combs, aggregated contiguously, removable combs are fastened, the combs being similar to those commonly used in sheep shearing machines. Above and in contact with each comb is a cutter of suitable width. Each cutter is held in position by a fork which is capable of oscillating on a pin. The cutters are so arranged that, when in operation they oscillate in contact with the combs, the tension being adjusted by means of tension screws. Inside each fork is provided a roller, the periphery of which is approximately spherical, to enable the same to have universal movement, without friction. Each roller moves freely on a pin which is rigidly secured to a tube or bar, which is capable of rapidly reciprocating in bearings provided in said frame. To actuate the said reciprocating bar, one end of the same is attached to one end of a bell crank lever, operating in lugs on the bracket; the opposite end of the bell crank lever being connected to an eccentric rod, operated by an eccentric on the drive shaft. The drive shaft passes through and revolves in bearings in a common frame and the rear of the swinging frame aforementioned, which latter is suspended from the drive shaft to enable it to be raised, in front, the necessary height for the skins to pass under the combs; or, when it is necessary to renew a comb, or cutter, or remove the same for sharpening, the whole frame can be turned back so as to expose its under face. For conveying the skins beneath the combs, I provide an axially bisected drum, secured on a rotatable shaft and having its halves hinged together, and held in their normally closed position by a tension spring. Foot levers are provided, which, when pressed downwardly, operate suitable toggles which are connected to each half of the drum and open the same to allow one end of the skin to be placed therein, so as to be gripped thereby when the foot levers are released. The drum is slowly rotated from the drive shaft by means of intermediate gear, and may be stopped at any point by the means and for the reason hereinafter mentioned.

To facilitate explanation drawings are annexed in which similar reference figures refer to similar parts.

Figure 2:
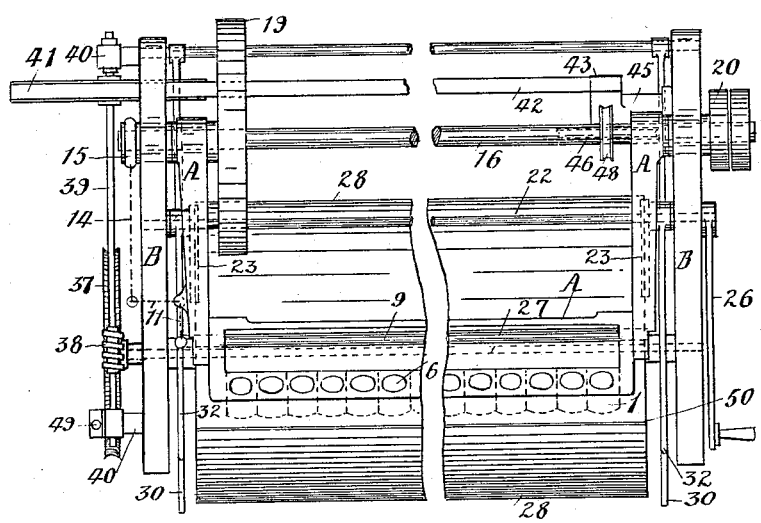
Figure 3:
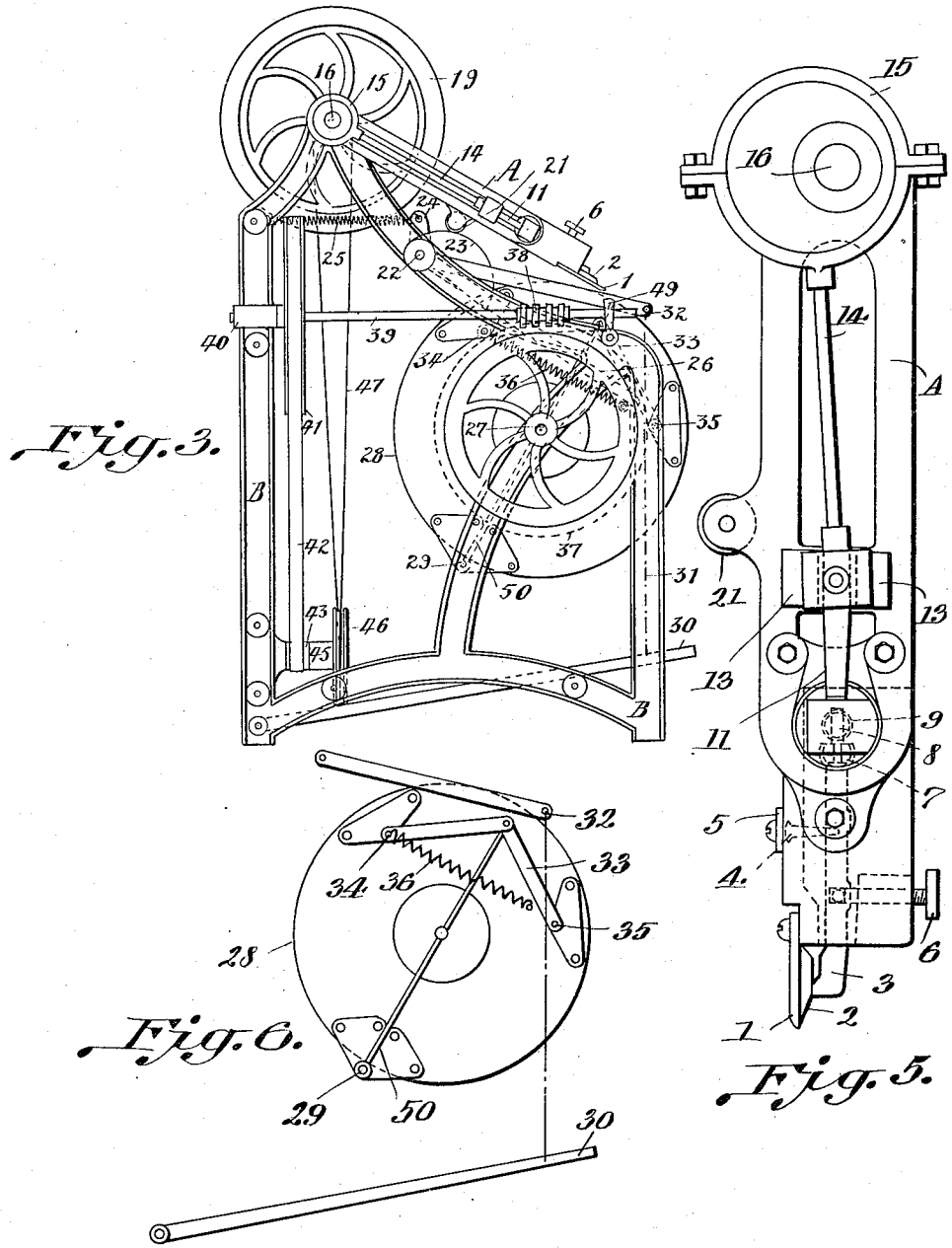
Figure 4:
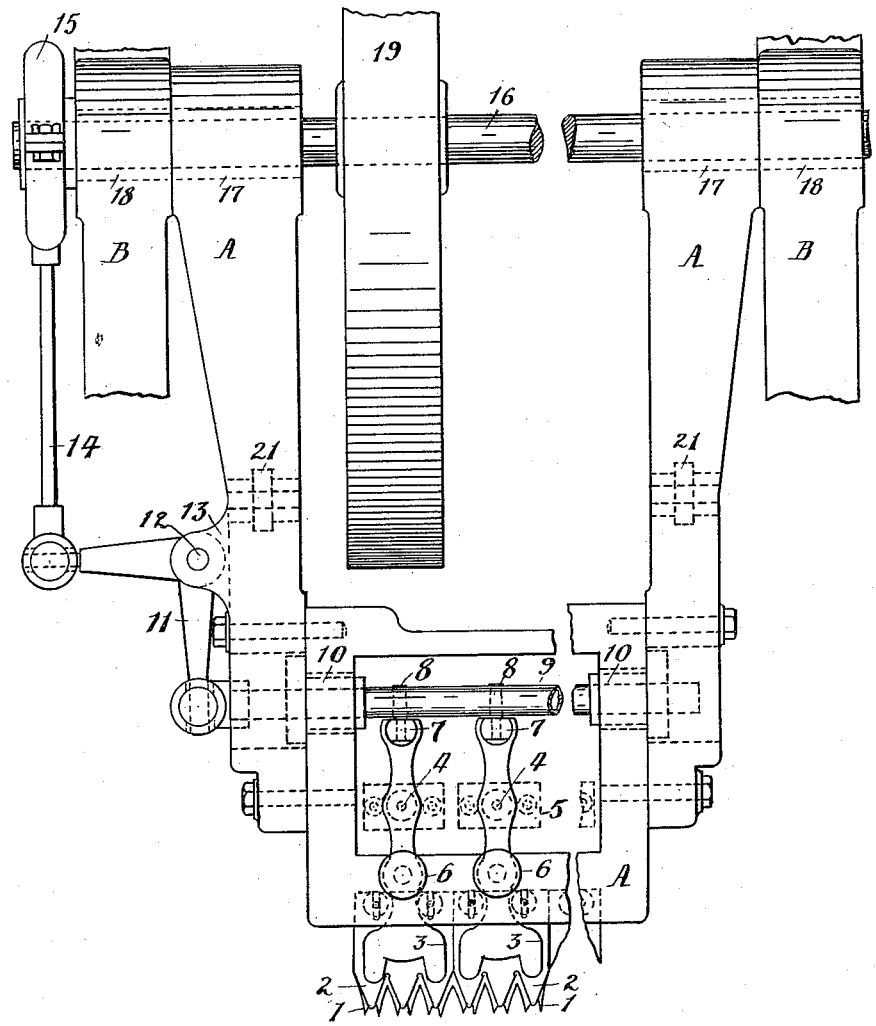

Figure 1 is an elevation of the general arrangement of the machine. Fig. 2 a plan of the same. Fig. 3 is a side elevation of the same. Fig. 4 a detail plan to an enlarged scale (approximately a third full size) of the swinging frame showing the combs and cutters. Fig. 5 a side view of the same, and Fig. 6 is a detail end view of the drum and the members for opening and closing the same.

A represents the swinging frame, B the main frame. In front and beneath the frame A, formed in a longitudinal recess, are screwed removable combs 1, fitted close together, any required number being used. 2 represent the cutters, 3 the forks which are capable of oscillating on tension pins 4, the lower ends of which are rounded and take their bearing on removable plates 5 which are screwed to a planed surface beneath the frame A. Tension screws 6, for adjusting the pressure of the cutters on the combs, are screwed in the frame A and bear on the forks 3. Rollers 7, capable of universal movement in forks 3, are fitted to move freely on pins 8 which are rigidly secured to or in a bar or tube 9 capable of longitudinal reciprocating movement in bearings 10 in the frame A. One end of the bar 9 is attached to one end of a bell crank lever 11 with free movement. The bell crank lever 11 operates on a pin 12 in lugs 13. The opposite end of the bell crank lever 11 is attached to one end of an eccentric rod 14, with free movement, which is operated by an eccentric 15 keyed or otherwise secured to the drive shaft 16, which passes through bearings 17, 17, in the swinging frame A and 18, 18, in the main frame B, and is capable of rotating in all the said bearings. A fly wheel 19 and fast and loose pulleys 20 are also on the drive shaft. Beneath frame A are rollers 21. On shaft 22 are cams 23 and levers 24. Springs 25 attached to the frame B and levers 24 tend to retain said cams in their normal position; a handle 26 is keyed to the shaft 22 for operating the cams. On shaft 27 is secured a drum 28 axially bisected, and hinged at 29. Foot levers 30 are connected by suitable connections 31 to the levers 32 which latter are keyed or otherwise rigidly secured on the shaft 22. Directly underneath each lever 32 is a toggle 33, the free end of one arm of which is pivoted to one half of the drum 28 at 34, while the other end is jointed to the other half of the drum at 35. The tension spring 36 attached to each half of the drum tends to retain the latter in its normal or closed position.

On the shaft 27 is keyed a worm wheel 37 operated by a worm 38 keyed on the shaft 39 which revolves in bearings 40 secured to the frame B. On shaft 39 is also a pulley 41 from which a belt 42 passes over a pulley 43, on the spindle 44, which revolves in a bracket 45. On the latter spindle is also keyed a pulley 46 from which passes a belt 47 over the pulley 48 on the drive shaft 16.

To operate the machine, the foot levers 30 are pressed downward, when the levers 32 will press on the toggles 33, thus forcing apart the halves of the drum 28. One end of a whole skin is inserted in the opening 50 and the foot levers released, when the springs 36 will close the opening 50 of the drum again, and the skin will be firmly gripped. The drum is now rotated by lowering the worm 38 into gear with the worm wheel 37 by means of the handle 49. The swinging frame A is raised in front by means of the cams 23 operated by the handle 26, and when the skin with the wool outward is beneath the combs, the hinged bracket A is lowered on to the skin; and as the drum is rotated the wool is shorn from the skin and falls outward toward the front, while the skin travels with the drum, and is released when shorn.

I am aware that combs and cutters have been used singly for shearing sheep, but I am not aware that similar combs and cutters have been so arranged that the latter act in unison in contact with the combs for shearing whole sheep skins.

I wish it understood that I do not confine myself to the identical means shown in the drawings and described herein for revolving the drum, but I may use their equivalent.

Having now fully described my invention, I declare that what I claim is:—

1. In a machine for shearing whole skins and hides, a swinging frame, a series of removable combs arranged contiguously on a planed surface formed upon the swinging frame; a corresponding series of removable cutters capable of oscillating in unison in contact with said combs, means for oscillating said cutters, and means for gripping and conveying the skin or hide when being shorn, substantially as described and shown in the drawings and for the purpose set forth.

2. In combination in a machine of the character described; the swinging frame A, the combs 1 carried thereby, cutters 2 adapted to be oscillated thereover, oscillating means therefor, the main frame B, an axially bisected drum 28 rotatably mounted therein, means for rotating the said drum, means for normally holding the said drum closed, toggles 33 mounted on the ends of the said drum and having the free end of each arm thereof pivotally secured to one half of the said drum, levers 32 mounted above the said toggles in the frame B, and adapted to spread the same when depressed, and means for depressing the said levers.

3. In combination in a machine of the character described, the supporting frame B, the frame A suspended therein, combs 1 removably secured to the under face thereof, cutters 2 adapted to be oscillated thereover, means for adjusting the said cutters relatively to the said combs, means for oscillating the said cutters, rotatable slide gripping means, rotating means therefor, means for normally holding the gripping means in gripping position, and means for releasing the said gripping means.

4. In combination in a machine of the character described, a main frame, a frame swingingly mounted therein, combs removably secured to the under face thereof, cutters adapted to be oscillated thereover, means for adjusting the said cutters relatively to the said combs, means for oscillating the said cutters, hide gripping means rotatably mounted in the said main frame, means for rotating the said gripping means, means for controlling the said rotating means, means for normally holding the said gripping means in gripping position, means for releasing the said gripping means, and means for raising the swinging frame coincidently with the release of the said gripping means.

In witness whereof I have hereunto set my hand in the presence of two witnesses.

HENRY ALFRED ROBERTS.

Witnesses:
WILLIAM WALKER,
OLIVER WALKER.